United States Patent
Siamon

(10) Patent No.: US 8,864,998 B1
(45) Date of Patent: Oct. 21, 2014

(54) BEAD FLUID TREATMENT SELF-CLEANING APPARATUS AND METHOD

(71) Applicant: Al Siamon, Arroyo Grande, CA (US)

(72) Inventor: Al Siamon, Arroyo Grande, CA (US)

(*) Notice: Subject to any disclaimer, the term of this patent is extended or adjusted under 35 U.S.C. 154(b) by 0 days.

(21) Appl. No.: 14/047,431

(22) Filed: Oct. 7, 2013

Related U.S. Application Data

(60) Provisional application No. 61/720,500, filed on Oct. 31, 2012.

(51) Int. Cl.
*B01D 15/02* (2006.01)
*B01J 8/08* (2006.01)

(52) U.S. Cl.
CPC .......................................... *B01J 8/08* (2013.01)
USPC ........... 210/661; 210/205; 210/289; 210/749; 442/139; 442/140; 442/261; 137/268

(58) Field of Classification Search
CPC .. B01D 15/02; B01D 24/36; B01D 2215/021; B01J 8/08
USPC ......... 210/263, 280–282, 289, 661, 205, 749; 137/268; 422/140, 267, 274, 139, 261
See application file for complete search history.

(56) References Cited

U.S. PATENT DOCUMENTS

| | | | | | |
|---|---|---|---|---|---|
| 4,642,192 | A | * | 2/1987 | Heskett | 210/638 |
| 4,995,418 | A | * | 2/1991 | Cervola | 137/268 |
| 5,770,089 | A | * | 6/1998 | Kubo | 210/661 |
| 5,833,850 | A | * | 11/1998 | Liu | 210/232 |
| 6,048,456 | A | * | 4/2000 | Palmer | 210/282 |
| 6,231,763 | B1 | * | 5/2001 | Chau | 210/266 |

* cited by examiner

*Primary Examiner* — Matthew O Savage
(74) *Attorney, Agent, or Firm* — William Keyworth; Bill & Mary Lou Inc.

(57) ABSTRACT

Reactive beads interact with a fluid to be treated in a treatment chamber that retains the beads in the chamber and provides a geometry which promotes the fluid flow agitation of the beads to enhance the treatment.

14 Claims, 7 Drawing Sheets

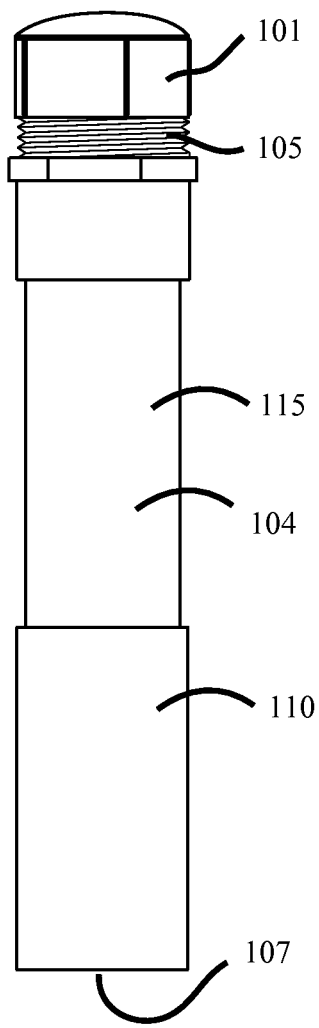
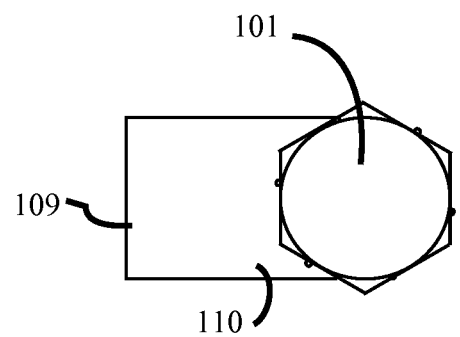
Fig. 9
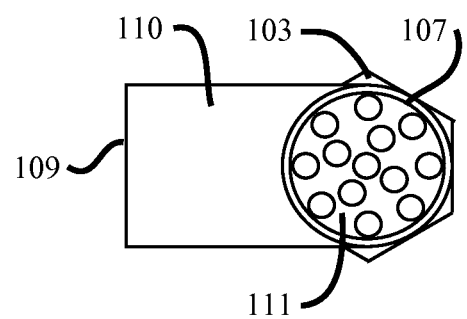
Fig. 10
Fig. 8

BEAD FLUID TREATMENT SELF-CLEANING APPARATUS AND METHOD

CROSS-REFERENCE TO RELATED APPLICATIONS

This application claims the benefit of priority from Provisional Patent Application No. 61/720,500 filed on Oct. 31, 2012, which is incorporated herein by reference in its entirety.

STATEMENT REGARDING FEDERALLY SPONSORED RESEARCH AND DEVELOPMENT

Not Applicable.

BACKGROUND OF THE INVENTION

1. Field of the Invention

This invention relates to a fluid treatment apparatus and method employing a multiplicity of reactive beads located in a treatment chamber arranged to provide self-cleaning and enhanced mixing with the fluid through agitation by the fluid motion, and further arranged to provide retention of the beads in the treatment apparatus by retention screens.

2. Description of Related Art

Reactive beads are widely used in a variety of applications as adsorbents, desiccants, reagents, and catalysts interacting with a fluid process stream. Depending on the application, they may consist of aluminosilicate minerals, clays, porous glasses, microporous charcoals, zeolites, active carbons, plant fertilizing chemicals, alkaline pH reduction, synthetic compounds, or other chemically or electrochemically active materials. Often, their capacity is limited due to saturation, fouling, or poor mixing with the process stream. The present invention is an apparatus and method for enhancing the effectiveness of reactive beads by providing an environment of robust agitation of the beads within the process stream.

SUMMARY OF THE INVENTION

In this application the term "bead" means a small, often, but not necessarily, round, piece of ceramic, stone, glass, organic material, wood, metal, synthetic, or other material with the property of chemical or mechanical treatment of a fluid through contact. The bead has the characteristic of the treatment property degrading with use, and the ability to partially or fully rejuvenate such treatment property by energetic contact with other beads or a wall of the treatment chamber.

The apparatus of the present invention is a treatment chamber body with a fluid inlet and a fluid outlet. The treatment chamber body also has an agitation area arranged to provide agitation of the beads by fluid flow into and out of the device. A removable closure fits on the chamber body closure attachment providing a fluid seal when attached, and an opening for insertion or withdrawal of beads when removed from the body. Screens are provided to prevent passage of the beads into the inlet or outlet connections, retaining them in the treatment chamber body.

The method of the present invention is to remove the removable closure providing an opening for insertion of the beads in the treatment chamber. The removable closure is then reattached and the fluid inlet and outlet are connected to a flow path for the fluid, if not permanently connected. Flow is then established into the chamber inlet and out the chamber outlet, which causes agitation of the beads as fluid flow is established from the inlet into and out of the chamber agitation area and also to the outlet.

OBJECTS AND ADVANTAGES

The object of this invention is to provide enhanced performance of reactive beads treating a fluid stream.

BRIEF DESCRIPTION OF THE SEVERAL VIEWS OF THE DRAWINGS

A more complete understanding of the present invention can be obtained by considering the detailed description in conjunction with the accompanying drawings, in which:

FIG. 8 is a rear view of a second embodiment of the invention.

FIG. 9 is a top view of a second embodiment of the invention.

FIG. 10 is a top view of a second embodiment of the invention.

REFERENCE NUMERALS IN DRAWINGS

Figure 1:
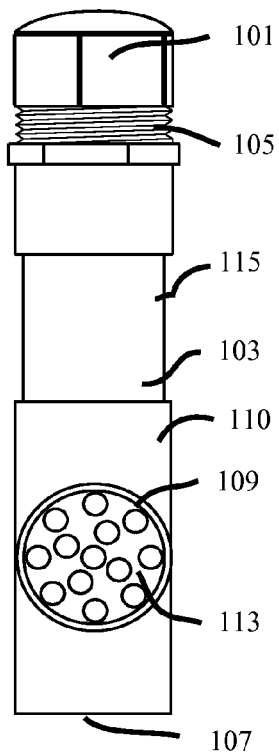
FIG. 1 is a front view of an embodiment of the invention.
Figure 2:
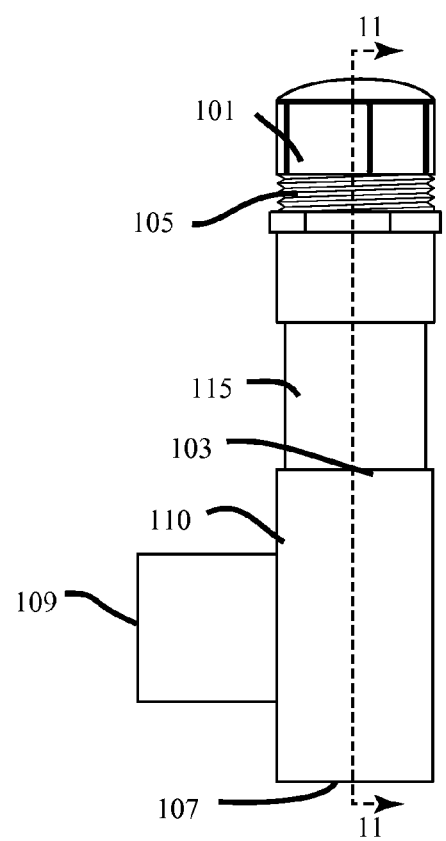
FIG. 2 is a left side view of an embodiment of the invention. The right side view is a mirror image and therefore is not shown. This figure shows the location of the cross section view of FIG. 11.
Figure 3:
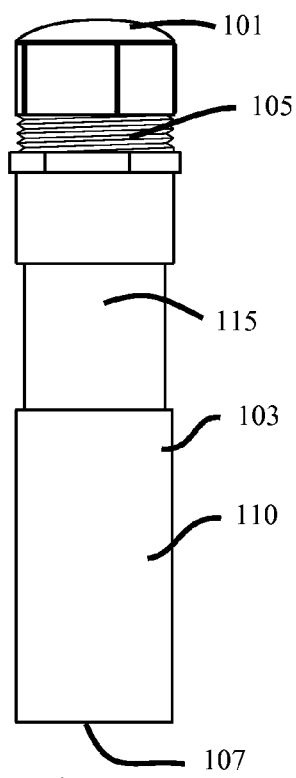
FIG. 3 is a rear view of an embodiment of the invention.
Figure 4:
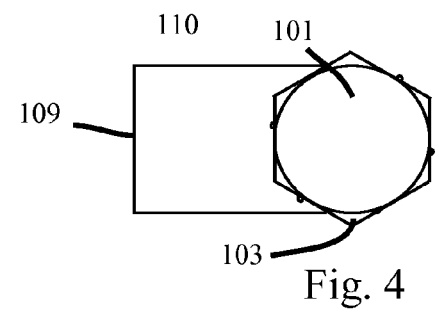
FIG. 4 is a top view of an embodiment of the invention.
Figure 5:
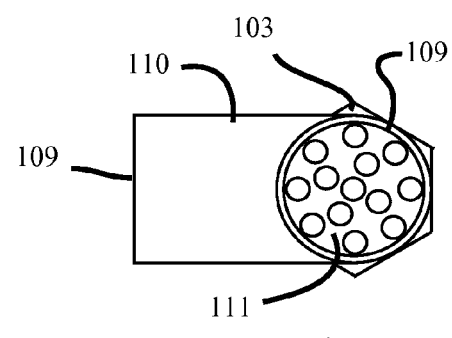
FIG. 5 is a bottom view of an embodiment of the invention.
Figure 6:
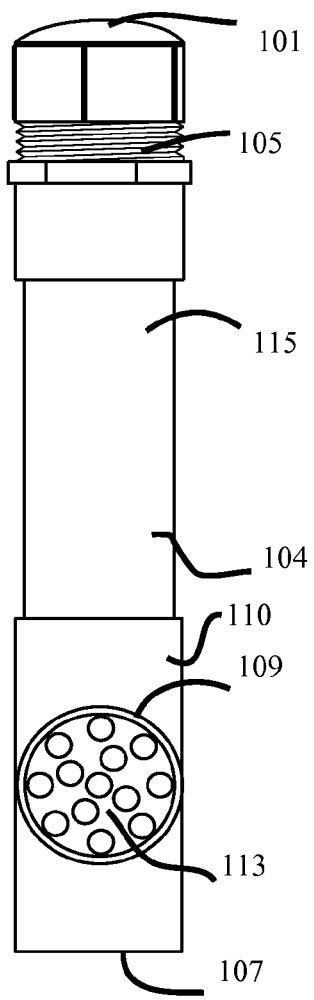
FIG. 6 is a front view of a second embodiment of the invention.
Figure 7:
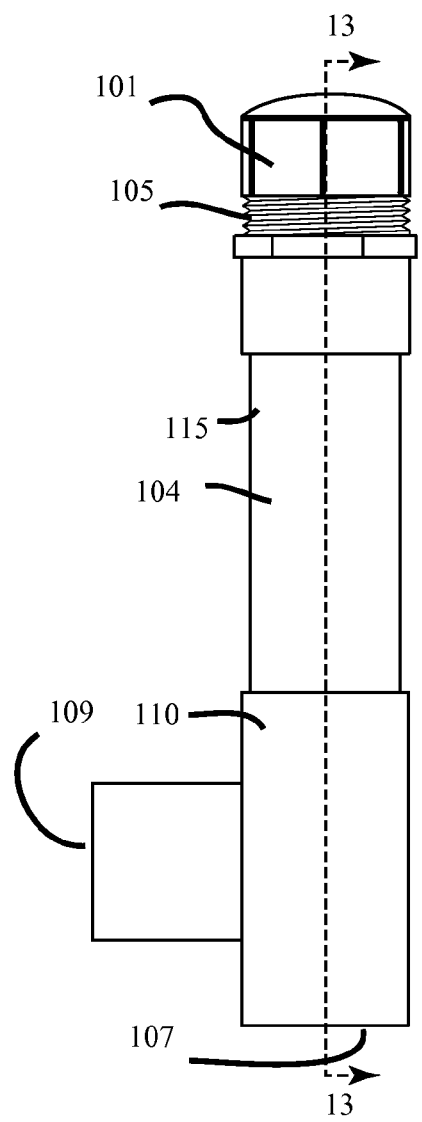
FIG. 7 is a left side view of a second embodiment of the invention. The right side view is a mirror image and therefore is not shown.
Figure 11:
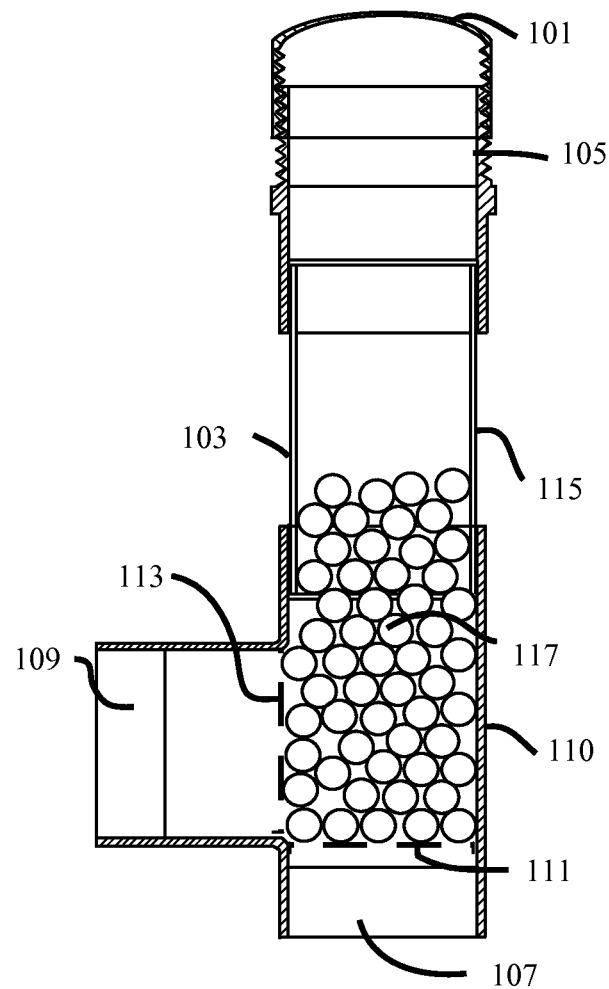
FIG. 11 is a cross section view at the location shown on FIG. 2 of an embodiment of the invention.

These reference numbers are used in the drawings to refer to areas or features of the invention.

101 Removable Closure
103 Chamber Body
104 Elongated Chamber Body
105 Chamber Body Closure Attachment
107 Inlet Opening
109 Outlet Opening
110 Chamber Body Inlet and Outlet Portion
111 Inlet Screen
113 Outlet Screen
115 Agitation Area
117 Reactive Bead

DETAILED DESCRIPTION OF THE INVENTION

The bead fluid treatment self-cleaning apparatus invention is a chamber arranged with a removable closure (101) on the chamber body (103), an inlet (107), and an outlet (109) as shown in various views on FIGS. 1 through 10, and in cross-section in FIGS. 11 through 14. The removable closure (101) is shown in the figures as attached to the chamber body (103) by a chamber body closure attachment (105) consisting of a threaded connection. Those familiar with the art will recognize there are many possible closure types capable of providing a removable closure, for example a bayonet plug configuration or a flanged bolted closure configuration. Another embodiment is to have a non-removable closure used for single use fluid treatments. The removable closure (101) provides access to the interior of the chamber body (103). The body contains an agitation area (115) located in the upper portion of the chamber as shown in FIGS. 1 *through* 3, 6 through 8, and 11 through 14.

The chamber body (103) contains multiple reactive beads (117), free to move and contact each other and the walls of the chamber body, as shown in FIGS. 11 through 14. These beads (117) are inserted in the chamber through the opening provided by the chamber removable closure (101) when opened or removed, and sufficient are inserted to provide the desired treatment, but still provide space in the chamber body (103) above the beads for the agitation area (115). An inlet screen (111) and an outlet screen (113) are provided to prevent passage of the reactive beads into the inlet (107) or outlet (108). These penetrable screens may be cast, formed of mesh, have machined openings, or otherwise configured to allow passage of fluid through the screen while preventing such passage of the beads (117) into the inlet (107) and outlet (108) respectively.

Figure 12:
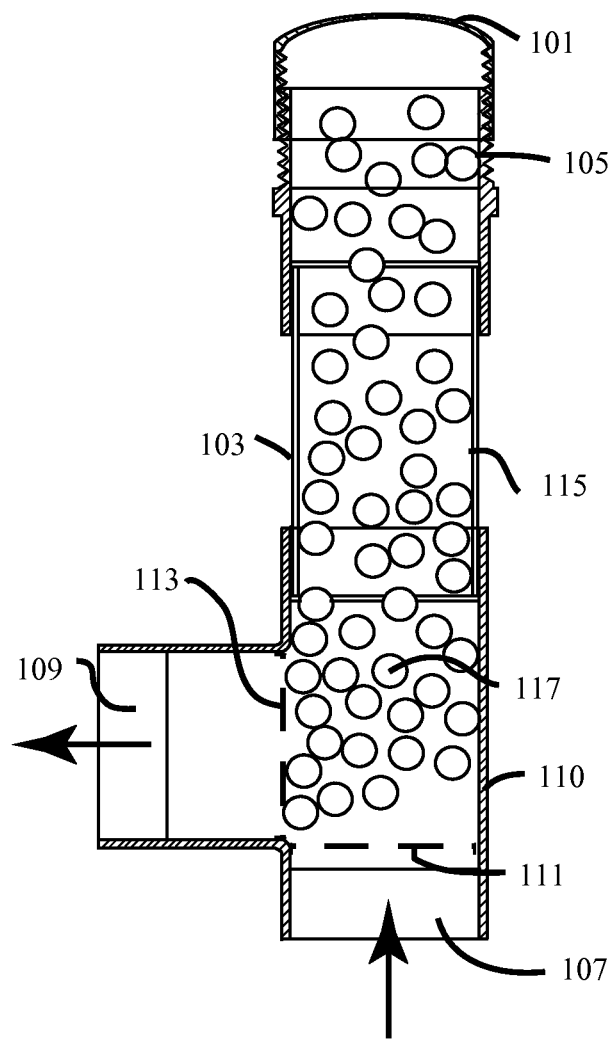
FIG. 12 is a cross section view at the location shown on FIG. 2 of an embodiment of the invention illustrating the device in service.
Figure 13:
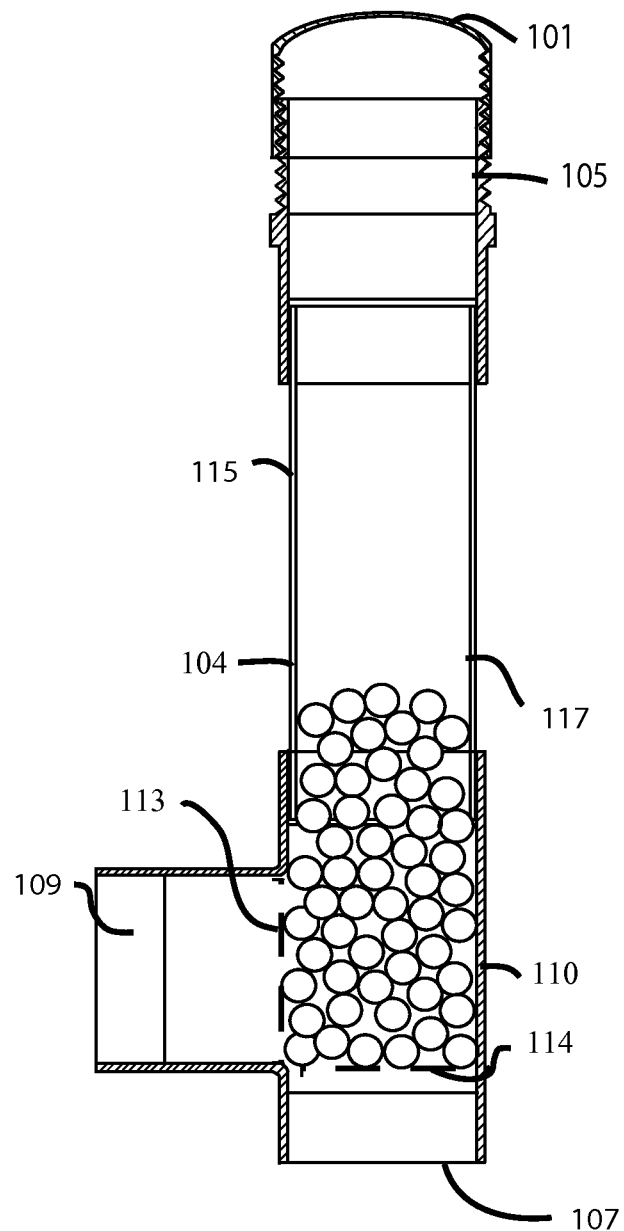
FIG. 13 is a cross section view at the location shown on FIG. 7 of an embodiment of the invention employing an expanded agitation area.
Figure 14:
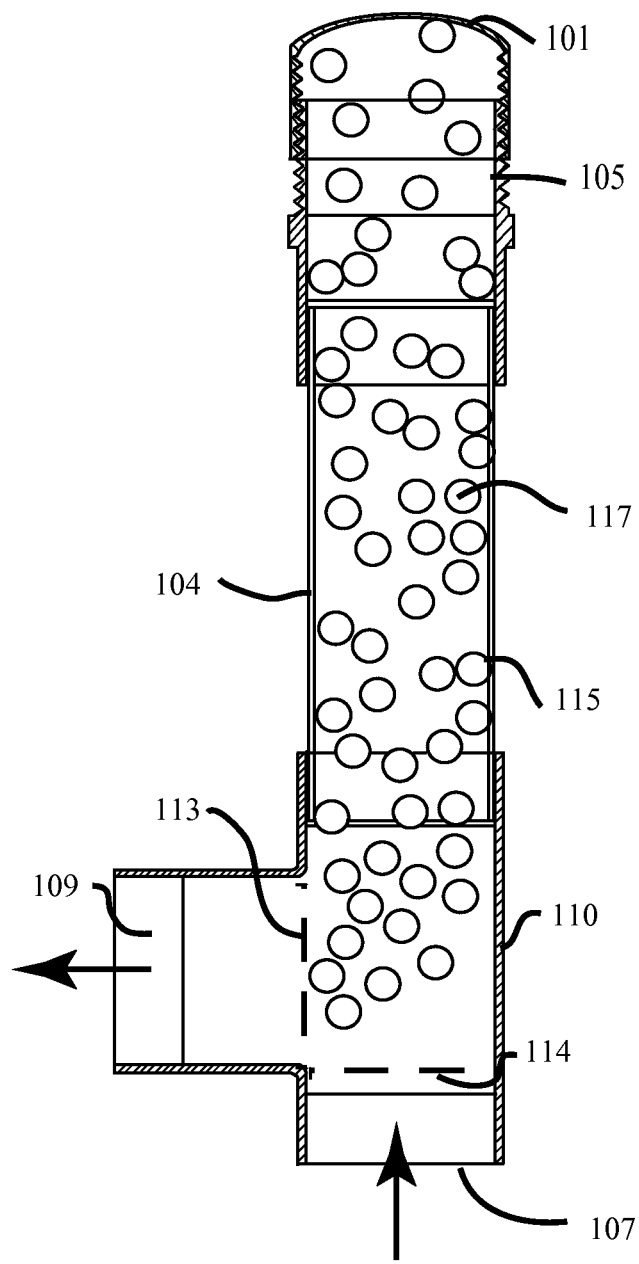
FIG. 14 is a cross section view at the location shown on FIG. 7 of an embodiment of the invention employing an expanded agitation area illustrating the device in service.

The chamber body (103) is connected to a fluid system providing fluid flow to the chamber inlet (107) at the bottom of the chamber body (103), and fluid flow from the chamber outlet (109) located at the side of the chamber body (103). The body (103) is configured so the flow coming into the chamber inlet opening (107), as shown by the vertical arrow in FIGS. 12 and 14, is directed upwards onto the reactive beads (117), and provides a motive force on the beads to move them toward the agitation area (115) portion of the body, located above the beads when first inserted into the chamber body (103). The fluid flow out of the body, as shown by the sideways arrow in FIGS. 12 and 14, provides a motive force on the beads to direct them toward the chamber outlet (109). This change in direction provides robust agitation of the beads as those in the flow path of the chamber inlet opening (107) move in the direction of the agitation chamber (115) and those in the flow path to the chamber outlet opening (109) move in the direction of the outlet opening. The beads collide with each other and with the walls of the chamber body and treatment chamber as they are agitated providing enhanced mixing with the fluid stream and promoting dislodgment of bead surface contaminants and any reaction products on the bead surface. The extent of agitation of the beads varies with the fluid type, flow rate, and fluid conditions, such as temperature and pressure, of the treatment process of interest.

Those familiar with the art will recognize the additional agitation area (115) volume provided by the embodiment with an elongated chamber body (104) as shown in FIGS. 6 through 8 and 13, 14, provides room for an increased reactive beads quantity with a resultant increase in bead-fluid reactions over the smaller agitation area (115) area volume shown in FIGS. 1 through 3 and 11, 12. The elongated chamber body (104) is defined for purposes of this application as a chamber body with an agitation area (115) distance between the portion of the body containing the inlet opening (107) and outlet opening (109) as shown in FIGS. 6 through 8 and 13, 14, and the chamber body closure attachment (105) greater than the height of the portion of the body containing the inlet opening (107) and outlet opening (109) and also greater than the height of the chamber body closure attachment (105). Combinations of these agitation area sizing embodiments may be varied to accommodate the desired fluid treatment. The embodiments of the invention shown and described have other possible variations and these descriptions are not intended to limit the invention.

Operation

The bead fluid treatment self-cleaning apparatus invention is loaded with reactive beads (117) by stopping fluid flow to the apparatus and opening the removable closure (101) on the chamber body (103), shown in FIGS. 1 through 3, 6 through 8, and 11 through 14. A desired quantity of the type of reactive bead (117) required for the desired treatment are inserted into the chamber body (103) and the removable closure is closed to contain the reactive beads (117) in the treatment chamber body (113). The fluid flow is then started in the directions indicated by the arrows in FIGS. 12 and 14, providing flow into the chamber body inlet opening (107) shown on the lower part of the chamber body. This fluid interacts with the reactive beads (117), moving beads in the upward flow path towards the agitation area of the treatment chamber (115) shown in FIGS. 12 and 14. Flow is also downward out of the agitation area towards the chamber outlet opening (109) shown in the side of the treatment chamber, and sideways, directly from the inlet to the outlet. The multiple flow paths create turbulence, providing agitation of the beads. This process is continued until the desired amount of fluid is treated. The fluid flow then is stopped and, if depleted, the reactive beads may be removed and replaced with still active beads and the treatment process restarted. Alternately, still active beads may be used to treat additional sources of fluid requiring treatment in succession, or further treat the current fluid.

Those skilled in the art will recognize this process may be further varied, for example, by recirculation of the treated fluid, adding other chemicals to the treatment fluid, or varying the fluid flow conditions to obtain the desired treatment. The description of the process herein have other possible variations and these descriptions are not intended to limit the invention.

I claim:

1. A device for treating a fluid comprising:
   (a) a chamber body with an inlet and outlet portion including a vertical flow path and a sideway flow path that intersects the vertical path, wherein a lower end of the vertical path forms a fluid inlet opening and an upper end of the vertical path is open, wherein the sideway path includes an inner end connecting with the vertical path and an outer end that forms a fluid outlet opening, an inlet screen that extends across the vertical path at an elevation that is below the sideway flow path, and an outlet screen extending across the sideway path at a location that is outside of said vertical flow path;
   (b) the chamber body also with an agitation area defining a vertical flow path having upper and lower ends that are open, wherein the lower end of the vertical path of the chamber body agitation area is connected to the open upper end of the vertical path of said inlet and outlet body portion;
   (c) the chamber body also with a closure attachment defining a vertical flow path having upper and lower ends that are open, wherein the lower open end of the vertical flow path of the closure attachment is connected to the open upper end of the vertical flow path of the chamber body agitation area portion;
   (d) a closure for closing the open upper end of the vertical flow path of the closure attachment;

(e) a plurality of reactive beads disposed in the chamber body defined by a portion of the vertical flow path of the inlet and outlet body portion disposed above the inlet screen, the vertical flow path of the agitation area of the chamber body, the vertical flow path of the closure attachment, and the closure; and (f) whereby a flow of fluid directed into the inlet opening will cause the reactive beads to move upwardly from the inlet screen toward the agitation area of the chamber and fluid exiting the outlet opening will cause the reactive beads to move downwardly from the agitation area of the chamber toward the inlet and outlet portion, the chamber thereby agitating the reactive beads within the chamber.

2. The device of claim 1 further comprising an agitation area height greater than a height of the inlet and outlet portion and also greater than a height of the closure attachment.

3. The reactive bead fluid treatment chamber of claim 2 wherein the fluid is selected from the group consisting of liquid and gas.

4. The reactive bead fluid treatment chamber of claim 3 wherein one or more of the bead reactions is selected from the group consisting of adsorbents, desiccants, reagents, and catalysts.

5. The reactive bead fluid treatment chamber of claim 4 wherein one or more of the bead materials is selected from the group consisting of aluminosilicate minerals, clays, porous glasses, microporous charcoals, zeolites, active carbons, plant fertilizing chemicals, alkaline pH reduction, synthetic compounds, or electrochemically active materials.

6. The reactive bead fluid treatment chamber of claim 1 wherein the fluid is selected from the group consisting of liquid and gas.

7. The reactive bead fluid treatment chamber of claim 6 wherein one or more of the bead reactions is selected from the group consisting of adsorbents, desiccants, reagents, and catalysts.

8. The reactive bead fluid treatment chamber of claim 7 wherein one or more of the bead materials is selected from the group consisting of aluminosilicate minerals, clays, porous glasses, microporous charcoals, zeolites, active carbons, plant fertilizing chemicals, alkaline pH reduction, synthetic compounds, or electrochemically active materials.

9. A method of treating fluids with reactive beads comprising:

(a) providing the device of claim 1;

(b) directing a flow of fluid into the fluid inlet opening;

(c) agitating the beads with fluid flow; and (d) receiving a flow of a treated fluid from the fluid outlet opening.

10. The method of claim 9 further comprising (a) stopping the fluid flow; (b) removing the chamber body closure attachment closure; (c) replacing the reactive beads; (d) installing the chamber body closure; and (e) restoring the fluid flow.

11. The device of claim 9 further comprising an agitation area height greater than a height of the inlet and outlet portion and also greater than a height of the closure attachment.

12. The method of claim 9 wherein the fluid is selected from the group consisting of liquid and gas.

13. The method of claim 12 wherein one or more of the bead reactions is selected from the group consisting of adsorbents, desiccants, reagents, and catalysts.

14. The method of claim 13 wherein one or more of the bead materials is selected from the group consisting of aluminosilicate minerals, clays, porous glasses, microporous charcoals, zeolites, active carbons, plant fertilizing chemicals, alkaline pH reduction, synthetic compounds, or electrochemically active materials.

\* \* \* \* \*